Sept. 1, 1931.  G. W. RUMBAUGH  1,821,448
CLOTHESLINE PULLEY
Filed May 27, 1930  2 Sheets-Sheet 2
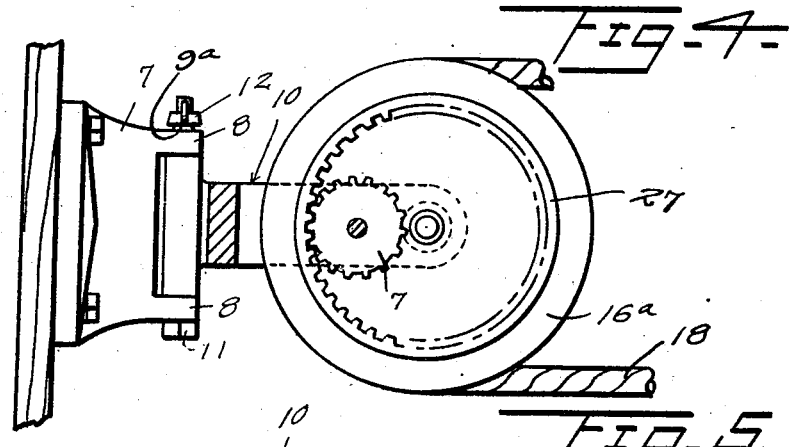
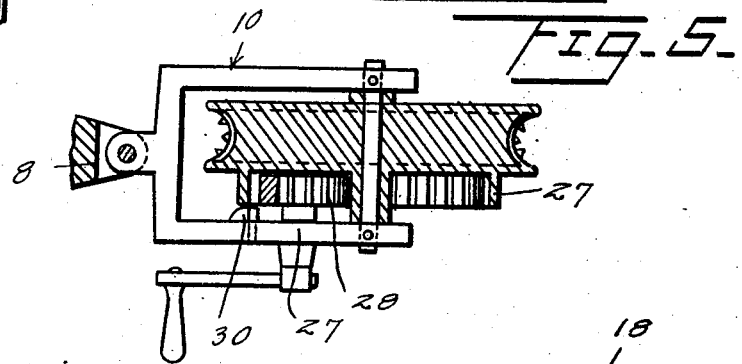
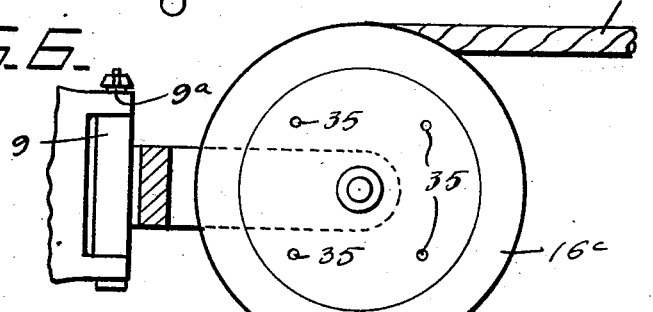
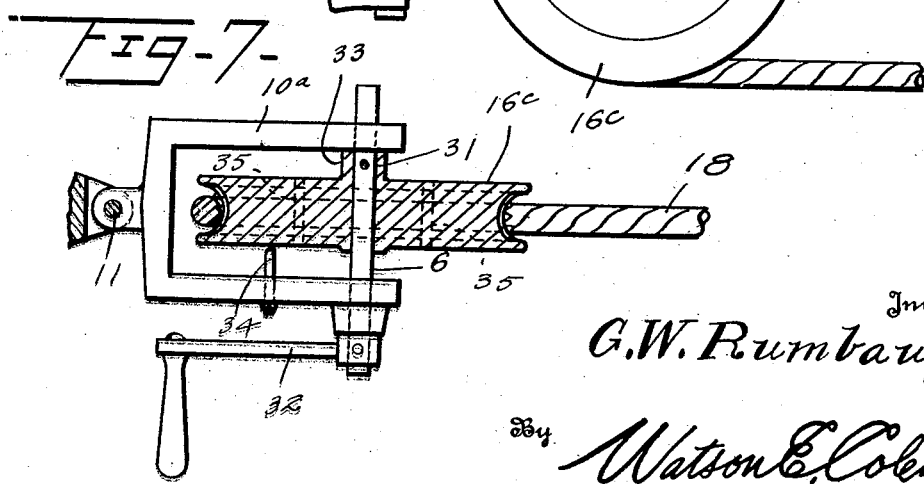
Inventor
G. W. Rumbaugh
By Watson E. Coleman
Attorney Patented Sept. 1, 1931

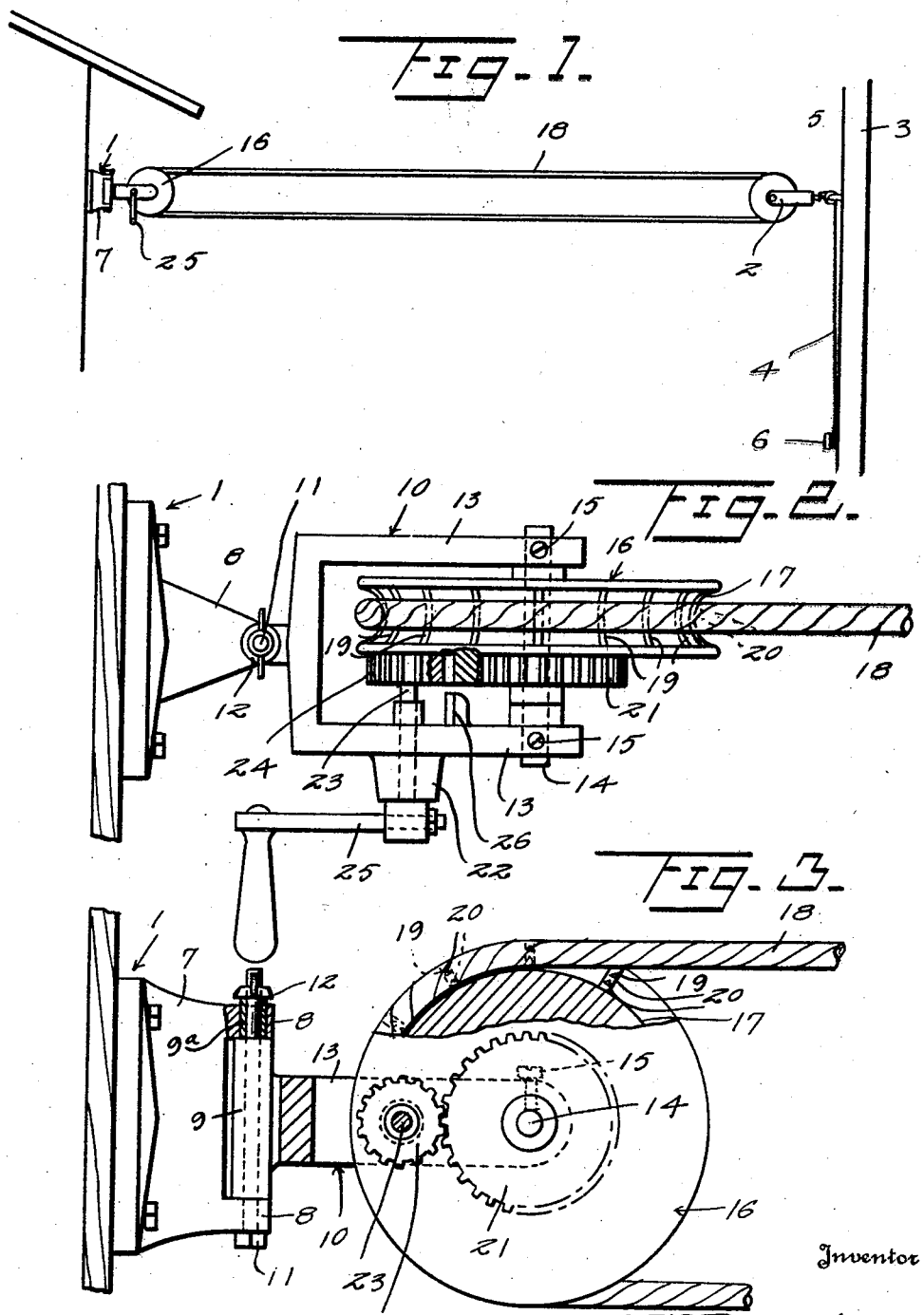

1,821,448

UNITED STATES PATENT OFFICE

GEORGE W. RUMBAUGH, OF PORT ANGELES, WASHINGTON

CLOTHESLINE PULLEY

Application filed May 27, 1930. Serial No. 456,242.

This invention relates to improvements in clothesline supports or pulleys.

The primary object of the present invention is to provide a clothesline pulley having an improved rope engaging surface of such a character that a rope or cable passing thereover will not slip no matter how much drag is placed upon the rope when the pulley is being turned.

Still another object of the invention is to provide an improved crank actuated rope pulley having a novel means associated therewith whereby the pulley may be secured against rotation as desired.

Still another object of the invention is to provide an improved pulley structure having gear means for rotating the same and having novel means for securing or locking said gears against rotation.

Another essential and novel feature of the present invention is the mounting for the pulley whereby the same may be permitted swinging movement upon a vertical axis and whereby said swinging movement may be checked as desired to hold the pulley in a desired position.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view illustrating the improved pulley embodying the present invention, in use.

Figure 2 is a view in top plan of the preferred form of my pulley structure.

Figure 3 is a view in side elevation of the structure shown in Figure 1, the same being partly in section.

Figure 4 is a view in side elevation of a modified form of my pulley, the supporting bracket therefor being in section.

Figure 5 is a horizontal sectional view through the pulley shown in Figure 4.

Figure 6 is a further modification of my pulley structure, the same being shown in side elevation and the bracket therefor being in section.

Figure 7 is a horizontal sectional view of the pulley shown in Figure 6.

Referring more particularly to the drawings wherein like numerals of reference indicate corresponding parts throughout the several views, Figure 1 illustrates the application of my improved clothes line supporting pulley wherein the bracket 1 which constitutes the base for the pulley is mounted upon a housing wall or any other suitable supporting structure and a cooperating pulley 2 of any suitable design is mounted in any suitable manner, as for example upon a pole 3, at a distance from the bracket 1. While it is not essential to the present invention, I prefer to have the outer pulley 2 attached to a cable 4 which passes through a supporting pulley 5 upon the pole 3, the other end of the cable being secured to the lower part of the pole after the pulley 2 has been raised to the proper height, by the use of a rope cleat 6 or in any other suitable manner.

In one form of my invention the bracket 1 which has a forwardly projecting portion 7 provided with a pair of spaced apertured ears 8 receives between the ears 8 a sleeve 9 which carries a fork or yoke 10. A threaded bolt 11 passes through the ears 8 and the sleeve 9 and threadably receives upon one end a wing nut 12 which bears against a collar 9a which is of a length greater than the thickness of the ear in which it fits, the collar being traversed by the end of the bolt upon which the nut is mounted. When the nut is drawn up upon the bolt it will bear against the collar and force the same down against the sleeve 9 thus forcing the sleeve into frictional contact with the lower ear 8 and binding it against rotation.

The outer ends of the arms 13 of the U-shaped yoke or fork 10 are formed to provide bearings for a shaft 14 which is held against rotation by set screws 15, one in each of said arms in the manner shown.

Mounted upon this shaft 14 and rotatable freely thereabout is a pulley body 16 in which a peripheral recess or groove 17 is formed for the reception of the clothes line or cable 18. As shown, this groove 17 in the pulley is provided with a plurality of transverse cleats 19 which carry short prongs 20. The rope or cable 18 must engage these prongs 20 and it will be readily seen from this that the slipping of the cable or rope about the pulley will be effectively prevented.

The pulley 16, which is preferably of metal construction, has cast integral with one face thereof a gear 21, this gear, of course, being concentric with the pulley.

One of the arms 13 of the yoke 10 is formed inwardly of its free end to provide a second bearing 22 through which there passes a shaft 23. This shaft 23 upon its inner end carries a gear pinion 24 and upon its outer end a crank 25. As shown, the bearing for the shaft 23 is of less length than the pulley between the gear 24 and the crank 25 so that the shaft will be permitted slight longitudinal movement in its bearing thus allowing a partial disengagement of the gear 24 with the gear 21.

Mounted upon the inner face of the arm 13 which carries the shaft 23 is a lug 26 which has an edge directed toward the gear pinion 24 so formed that it may enter between a pair of the teeth of the gear pinion. This lug is so positioned with respect to the gear pinion that when the latter is shifted with the shaft 23 on which it is mounted it will be engaged by the lug and thus held against rotation. Due to the fact that the gear pinion 24 does not completely disengage from the gear 21 when it becomes engaged by the lug 26, it will be readily seen that the gear 21 will also be held against rotation.

From the foregoing it will be apparent that with the gear pulley described the actuation of the clothesline 18 will be positive and because of the manner in which the fork 10 is mounted no difficulty will be encountered in the rotation of the gears and the pulley as a result of the swinging of the supporting structure therefor.

In Figure 4 I have shown a slight modification of the structure just described. In this form of my invention the pulley which is here indicated generally by the numeral 16a is of the same general construction as the pulley 16 and is mounted in exactly the same manner. However, instead of an ordinary external toothed gear being associated with this pulley, there is secured thereto or cast integral therewith as found most desirable, an internal gear 27. This internal gear has in mesh therewith a gear pinion 28 similar to the pinion 24 and mounted, like the pinion 24, upon a shaft 29 which is permitted slight longitudinal movement. Mounted adjacent the pinion 28 is a locking lug 30 which engages between a pair of the teeth of the pinion when the same is partially withdrawn from the gear 27, to secure it and the gear 27 against rotation.

In Figure 6 a second modified form of my invention is illustrated. In this form the pulley 16c which is supported in a yoke or fork 10a of the same construction as the fork 10, is mounted upon a shaft 31 which is rotatable and which carries at one end a crank 32. At one side of the pulley 16c, the side away from the pulley 32, a sleeve 33 surrounds the shaft 31 to limit the movement of the pulley and the shaft in one direction.

The shaft 31, may, however, be shifted in the opposite direction or toward that side of the fork 10a adjacent which the handle 32 is positioned. The side of the fork adjacent the handle 32 carries an inwardly extending pin 34 which, when the pulley 16c is drawn over, engages in one of a number of apertures 35 formed in the web of the pulley. In this manner the pulley 16c may be secured in any number of positions, dependent upon the number of apertures 35 which are formed in the web thereof.

From the foregoing description it will be readily seen that with a pulley constructed in accordance with my invention a clothesline, or any other type of line, may be readily shifted as desired and may be easily and quickly secured against movement when such securing is desirable.

Having thus described my invention, what I claim is:

1. A clothesline windlass, comprising a bracket, a forked yoke carried by said bracket, a shaft mounted between the arms of said yoke, a pulley mounted upon and secured to said shaft, said pulley having a plurality of apertures in one face thereof and said shaft being supported for limited longitudinal movement, a crank handle carried by said shaft, and a pin carried by said fork and directed toward said pulley for engagement in one of said apertures when the pulley is shifted the pulley being shifted upon longitudinal movement of said shaft in one direction to engage said pin in one of said apertures.

2. A pulley of the character described, comprising a body having a peripheral rope groove therein, a plurality of transversely disposed cleats in said groove designed to prevent the slipping of a rope lying therein, and pointed elements carried by said cleats for engagement with the rope body.

In testimony whereof I hereunto affix my signature.

GEORGE W. RUMBAUGH.